United States Patent Office 3,623,196
Patented Nov. 30, 1971

3,623,196
METHOD OF PROVIDING AN ANTI-IMPLOSION CLAMPING BAND AROUND THE ENVELOPE OF A COLOUR TELEVISION PICTURE TUBE
Hendrik Bongenaar and Theodorus Cornelis Gerardus Doreleijers, Emmasingel, Eindhoven, Netherlands, assignors to U.S. Philips Corporation, New York, N.Y.
Filed July 24, 1969, Ser. No. 844,514
Claims priority, application Netherlands, Aug. 1, 1968, 6810978
Int. Cl. H01j 9/18
U.S. Cl. 29—25.13                                       3 Claims

ABSTRACT OF THE DISCLOSURE

A method of providing without damage to the seam, an anti-implosion clamping band upon a colour television picture tube having envelope window and cone secured together by means of a solder glass. A profiled band comprising narrow and wide portions is slid, with its wide portion foremost, from the window entirely over the mould match line; permanent deformation of the band being avoided by heating the band or by providing saw cuts in the more narrow portion of the band.

---

Figure 1:
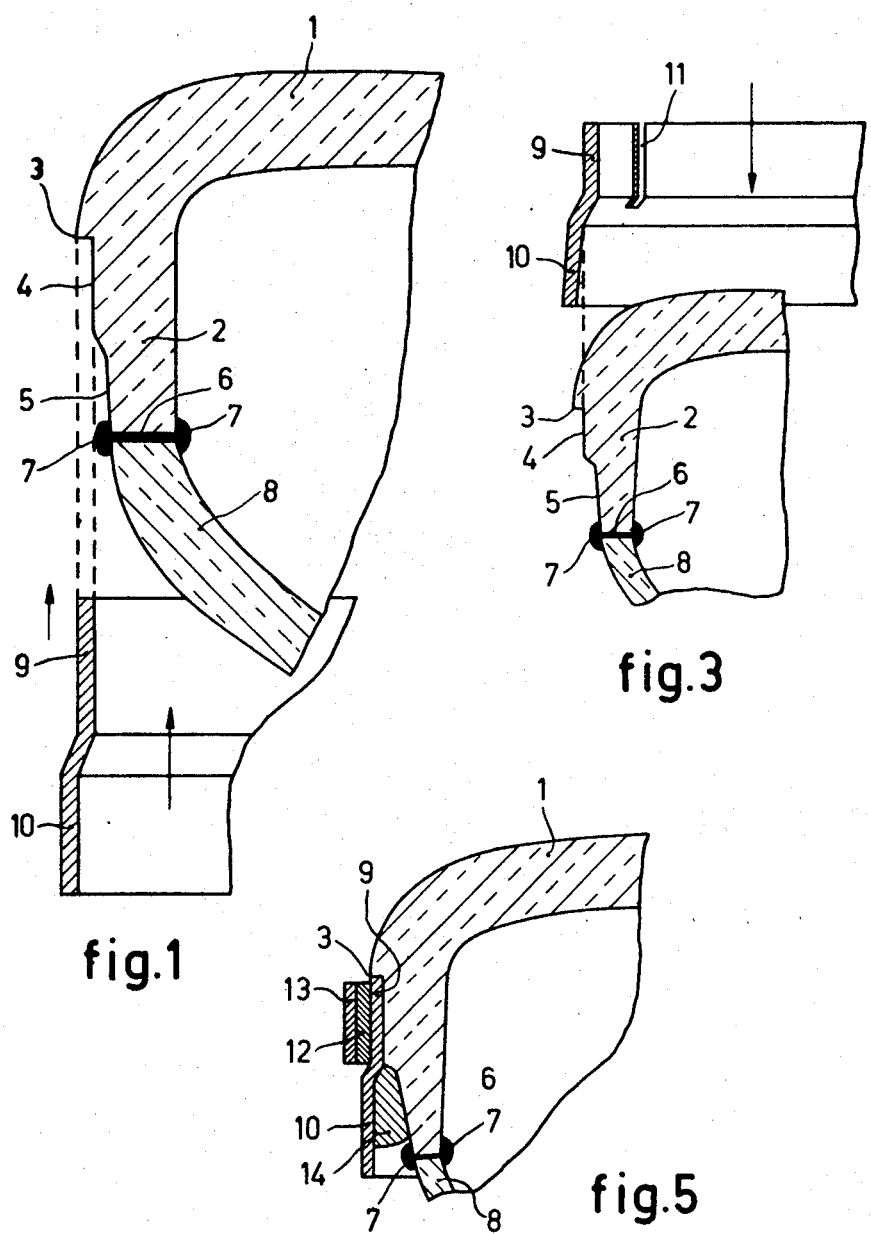

The invention relates to a method of providing an anti-implosion clamping band around the envelope of a colour television picture, tube, particularly an envelope in which a cup-shaped window is secured to a cone by means of a solder glass.

The invention furthermore relates to a colour television picture tube comprising an anti-implosion clamping band which is provided by means of said method.

For structural reasons it is often desirable that the front part of the envelope of a picture tube should project from the cabinet. Anti-implosion clamping bands are then provided entirely on the side of the cone of the mould match line so that the part of the upright edge of the window which is situated between the mould match line and the picture screen remains uncovered. The mould match line is often shaped so that the cross-section of the part of the upright edge adjoining the picture surface is slightly larger than that of the part of the edge situated on the side of the cone. In this case, the mould match line also serves as an abutment for the anti-implosion clamping band. For that purpose, said band is always provided around the envelope from the side of the cone until it bears against the mould match line. The band may previously be heated and then slid over the envelope as far as the mould match line, or it may be forced over the envelope in the cold condition.

In black-and-white tubes, in which the cone and the window are sealed together, this method does not present any particular difficulties.

I the case of colour television picture tubes, however, the cone is soldered to the window by means of a solder glass. The solder glass forms a comparatively thick ridge on the outside and the inside of the welding place, which ridge projects beyond the upright edge of the window. When the clamping band or clamping cap is slid onto it, said ridge projecting from the glass surface is apt to be damaged.

This drawback can be avoided in a method of providing an anti-implosion clamping band around the envelope of a television picture tube, particularly a colour television picture tube, in which the window and the cone are secured together by means of a solder glass, if, according to the invention, the band is profiled and has a wider and more narrow portion and is slid on the envelope and over the mould match line with its wide portion foremost from the side of the window until the band is situated entirely on the side of the cone of the mould match line so that the wider portion of the band surrounds the seam and the narrow portion exerts a pressure on the envelope in such manner that the band, upon passing the mould matched line experiences no permanent deformation. For that purpose the band may be heated so that the narrow portion has expanded to such an extent that it easily slides over the mould match line, or a few saw cuts may be provided in the band at right angles to the edge of the narrow portion as a result of which said portion becomes slightly flexible. In this latter case one or more clamping bands will be provided around said narrow portion, since the flexible parts cannot exert sufficient pressure on the envelope to ensure a reliable anti-implosion.

Figure 2:
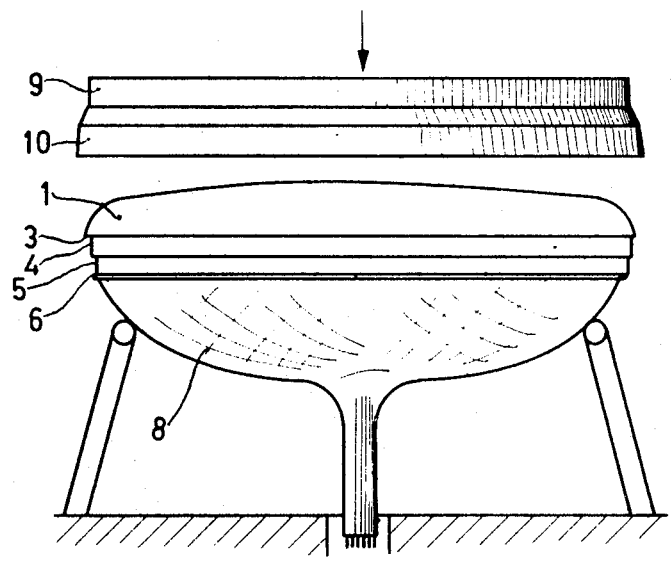
Figure 4:
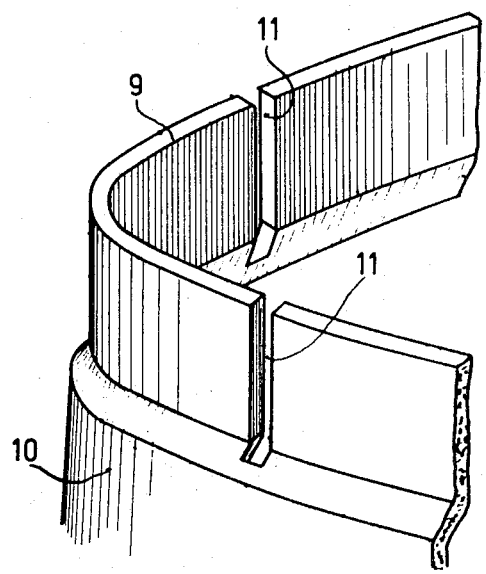

In order that the invention may be readily carried into effect, it will now be described in greater detail, by way of example, with reference to the accompanying drawings, in which FIG. 1 is a cross-sectional view of a part of a window and a part of a clamping band which is provided in the conventional manner, FIG. 2 shows how a band according to the invention is provided, FIG. 3 shows a detail of FIG. 2, while FIG. 4 shows a detail of a band according to the invention, and FIG. 5 shows a detail of a band provided around a tube.

Referring now to the figures, reference numeral 1 denotes the window which comprises an upright edge 2. The mould match line is denoted by 3. A substantially cylindrical wall portion 4 adjoins the mould match line. The part 5 of the wall decreases in diameter up to the seam 6. The edge 2 is secured to the cone 8 by means of a solder glass. The solder glass forms a ridge 7 on the outside and inside of the seam 6.

The anti-implosion clamping band consists of a profiled band having a narrow portion 9 which is to clamp around the part 4 of the edge 2, and a wider portion 10 which surrounds the envelope with some play, which space will afterwards be filled partly with a filler 14 as is shown in FIG. 5. The band 9, 10, may be heated and slid on the part 4 of the envelope with its narrow portion 9, until it bears against the mould match line 3. After cooling the portion 9 serves as an anti-implosion clamping band. The pressure on the envelope may be increased, if desirable, by providing one or more clamping bands 12, 13 around the portion 9, as is shown, for example, in FIG. 5.

As is shown in FIG. 1, there exists a fair chance that the ridge 7 of the seam 6 is damaged when the portion 9 of the clamping band is slid onto it.

According to the invention this is avoided, as is shown in FIG. 2, by sliding the clamping band, 9, 10 over the envelope from the side of the window.

A difficulty however, is that the portion 9 of the band has to slide entirely over the mould match line 3. When the band is considerably heated, the portion 9 can be slid over the mould match line 3 without any danger for the glass. However, when the band 9, 10 is slid over the envelope in the cold condition, the portion 9 according to the invention is provided with a number of gaps 11, as is shown in FIG. 4, preferably on either side of each corner. The portion 9 of the band hence becomes flexible so that, when the portion 9 of the band is slid over the glass, the pressure on the glass of the mould match line 3 does not become so large that the glass is damaged. In this case, however, it is necessary to provide one or more clamping bands 12, 13 over the portion 9 of the band (see FIG. 5). The space between the portion 10 of the band and the envelope is then filled with a filler, for example, an epoxy resin, the synthetic material polyvinyl chloride, or some other suitable filler, preferably up to the seam 6 so that the ridge 7 remains free. If desirable, an adhesive, for example polyvinyl acetate, may be provided between the band portion 9 and the envelope portion 5 prior to sliding the band over the envelope.

An advantage of the profile of the band cross-section shown is further that the transport of a large number of bands is simple, since the bands can be slid one in the other, the narrow portion 9 of one band being situated in the wider portion 10 of the next band.

The profile is such that the band can be obtained by bending and welding a correspondingly profiled strip. As a result of this such bands are cheap in manufacture.

What is claimed is:

1. A method for providing an anti-implosion clamping band around the envelope of a television picture tube, particularly a colour television picture tube, comprising, securing the window and the cone sections of said envelope together by means of a solder glass, the band which comprises a wider portion (10) and a more narrow portion (9) on the envelope and over the mould match line (3) with its wide portion (10) foremost from the side of the window until the band (9, 10) is situated entirely on the side of the cone of the mould match line (3) so that the wider portion of the band surrounds the seam (6) and the narrow portion (9) exerts a pressure on the envelope so that the band, (9, 10) upon passing the mould match line (3), experiences no permanent deformation.

2. A method as claimed in claim 1, further comprising heating the band (9, 10) considerably so that the narrow portion can slide over the mould match line (3) without permanent deformation.

3. A method as claimed in claim 1, further comprising cutting the narrow portion (9) of the band so that the band comprises a few saw cuts (11) extending at right angles to the edge, and arranging one or more clamping bands (12, 13) around the narrow portion (9) after the band is in place.

References Cited
UNITED STATES PATENTS

| | | | |
|---|---|---|---|
| 2,785,820 | 3/1957 | Vincent et al. | 220—2.1 |
| 2,874,017 | 2/1959 | Henry et al. | 178—7.82 |
| 3,162,933 | 12/1964 | Trax et al. | 29—25.11 |
| 3,220,592 | 11/1965 | Powell et al. | 220—2.1 |
| 3,260,397 | 7/1966 | Gier et al. | 220—2.1 |
| 3,271,516 | 9/1966 | Damm | 220—2.1 |
| 3,314,566 | 4/1967 | Minneman et al. | 220—2.1 |
| 3,317,172 | 5/1967 | Balint | 220—2.1 |
| 3,508,310 | 4/1970 | Eisses | 29—25.13 |
| 3,512,234 | 5/1970 | Bongenaar, et al. | 29—25.13 |
| 3,512,674 | 5/1970 | Wittenbecher | 220—2.1 A |

JOHN F. CAMPBELL, Primary Examiner

D. P. ROONEY, Assistant Examiner

U.S. Cl. X.R.

29—25.11, 447; 178—7.82; 220—2.1; 316—17